July 10, 1923.
F. R. GIDDINGS
1,461,115
MEANS FOR DIPPING AND COATING CONFECTIONERY
Filed March 7, 1922
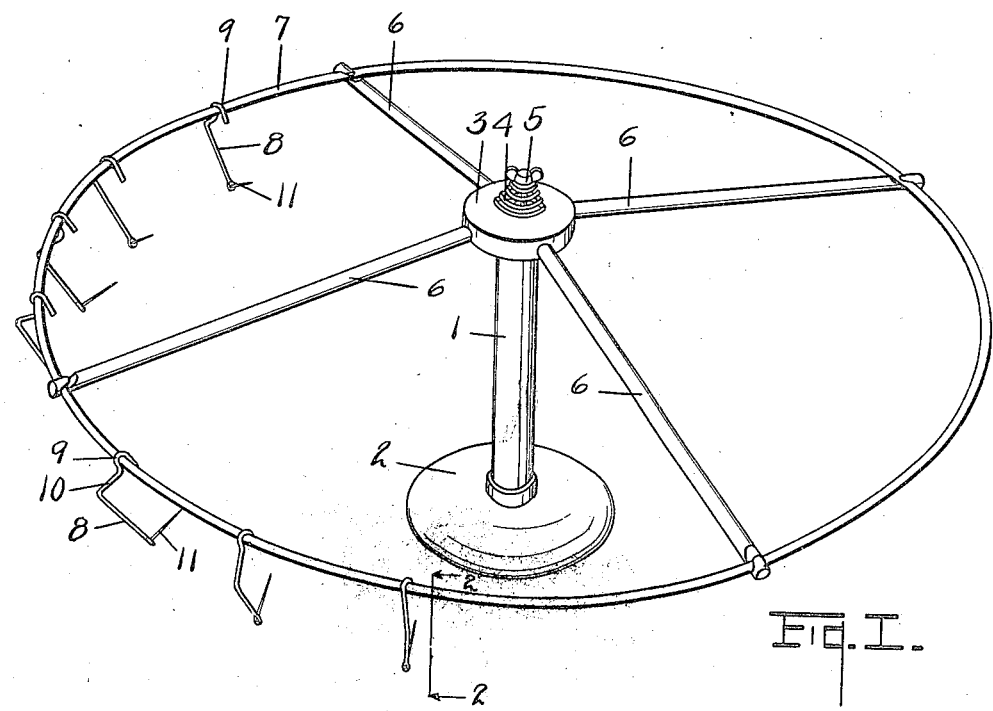
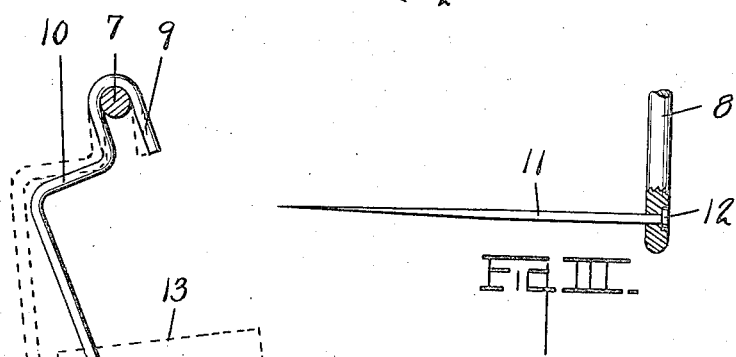
INVENTOR.
Frank R. Giddings
BY
Chappell & Earl
ATTORNEYS Patented July 10, 1923.

1,461,115

UNITED STATES PATENT OFFICE.

FRANK R. GIDDINGS, OF KALAMAZOO, MICHIGAN, ASSIGNOR OF ONE-HALF TO VANCE G. PIPER, OF KALAMAZOO, MICHIGAN.

MEANS FOR DIPPING AND COATING CONFECTIONERY.

Application filed March 7, 1922. Serial No. 541,658.

*To all whom it may concern:*

Be it known that I, FRANK R. GIDDINGS, a citizen of the United States, residing at the city and county of Kalamazoo, State of Michigan, have invented certain new and useful Improvements in Means for Dipping and Coating Confectionery, of which the following is a specification.

This invention relates to improved means for dipping and coating confectionery.

The invention is particularly adapted and intended for use in coating bars of ice cream with chocolate and pertains particularly to the suspending device and supporting hook or pin for the work.

The main object of the invention is to provide such a hook or support that will hold up a bar of ice cream and permit the same to be readily removed without breaking the surface of the chocolate or other coating thereon.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a detail perspective view of a revolving frame or rack with my improved hooks disposed thereon.

Fig. II is an enlarged detail sectional view on line 2—2 of Fig. I showing one of my improved hooks substantially full size suspended upon the rim of the revolving rack.

Fig. III is an enlarged detail view, partially in section, on a line 3—3 of Fig. IV showing the method of attaching the supporting pin to my improved hook.

Fig. IV is a detail elevation view of the parts appearing in Fig. III.

In the drawing the sectional views are taken looking in the direction of the little arrows at the ends of the section lines and similar numerals of reference refer to similar parts throughout the several views.

The various parts of the drawing will be considered by their numbers. 1 is the central supporting column of the revolving rack provided with a broad base 2. Central turn table 3 is suitably pivoted and held yieldingly in position by the spring 4 under the thumb nut 5. Radial arms 6 extend out and support the carrying rim 7 on which are disposed my improved hook hangers 8 having hooks 9 to engage the rim 7 and offset portions at 10 and laterally extending pins 11 at the bottom thereof for engaging and supporting a bar of ice cream. These pins are the usual headed pins 12 of large size and are inserted through the depending wire of the hanger 8 and suitably retained there by solder or otherwise.

These pins 11 are inserted into a bar of ice cream 13 as indicated by the dotted lines in Fig. II and the weight of the bar, after it has been dipped and coated, causes the hook to swing to the inclined position indicated therein, and the chocolate or other coating material, while it is still fluid, will drip down and off leaving the pin 11 at point of penetration with substantially none of the coating material thereon and without an accumulation at that point.

Having thus described my invention what I claim as new and desire to secure by Letters Patent is:

1. In a dripping and drying hanger for coating purposes, the combination of a hanger formed of a wire with hook at its upper end and an offset and depending portion with a smooth, straight, slim pin at right angles thereto secured thereto by insertion through the lower end of said hanger whereby a bar of material will hang at an angle on the rack, as specified.

2. In a dripping and drying hanger for coating purposes, the combination of a hanger formed of a wire with hook at its upper end and an offset and depending portion with a smooth, straight, slim pin at right angles thereto at the lower end of said hanger whereby a bar of material will hang at an angle on the rack, as specified.

In witness whereof, I have hereunto set my hand and seal.

FRANK R. GIDDINGS. [L. S.]